Aug. 29, 1961     G. F. DAVIES     2,997,777
METAL FILTERS

Filed Oct. 29, 1958     2 Sheets-Sheet 1

INVENTOR.
GAIL F. DAVIES

BY

ATTORNEY

Aug. 29, 1961   G. F. DAVIES   2,997,777
METAL FILTERS
Filed Oct. 29, 1958   2 Sheets-Sheet 2

INVENTOR.
GAIL F. DAVIES
BY
Francis H. Masselle
ATTORNEY

United States Patent Office 2,997,777
Patented Aug. 29, 1961

2,997,777
METAL FILTERS
Gail F. Davies, Mentor, Ohio, assignor to Clevite Corporation, Cleveland, Ohio, a corporation of Ohio
Filed Oct. 29, 1958, Ser. No. 770,449
14 Claims. (Cl. 29—182)

This invention relates to fluid filters and methods of their manufacture and more particularly to filters fabricated of titanium, zirconium, hafnium or alloys thereof. This is a continuation-in-part of copending application Serial No. 319,305, filed November 7, 1952, and now abandoned.

Presently available metal filters are handicapped by the fact that their functional permeability is greatly reduced in a short period of time when used under corrosive conditions. This reduction in permeability is caused either by corrosion products lodging in and clogging the permeable passages in the filter or by growth of the metal particles comprising the filter with the result that some or all of the passages are reduced in size or completely occluded. In either case, the performance of the filter varies with time and its useful life is severely limited.

A further disadvantage of presently available metal filters is the lack of strength characteristic of filter materials having high permeability-to-porosity ratio. Moreover, most available filter materials do not perform satisfactorily under oxidizing conditions at temperatures above 250° C. for extended periods of time.

It is a broad, fundamental object of the present invention to provide fabricated, fluid-permeable materials which overcome at least one of the aforementioned disadvantages of the prior art and methods of fabricating such materials.

More specifically, it is an object of the invention to provide novel fluid-permeable materials which are highly resistant to the corrosive action of practically all acids and bases as well as other active chemical agents.

Another object is the provision of novel filters which can be successfully operated continuously at temperatures up to about 500° C. and intermittently up to about 700° C.

A further object is the provision of a novel fluid filter having remarkably uniform permeability throughout its cross-sectional effective filter area.

Still another object is to provide improved methods of producing filter elements in a wide range of sizes and shapes.

A further object is the provision of novel methods of manufacturing filter elements allowing control of density and permeability in order to produce elements of predetermined filter characteristics.

As used herein the term "permeability" is intended to express the degree of interconnection between voids in a relatively porous filter element and is stated in terms of a percentage of volume rate of flow occurring through the filter element taking as 100% the volume rate of flow of the same fluid under the same pressure head through a pipe of the same cross-section as the filter element. Permeability is distinguished from specific flow capacity which is expressed in absolute terms, e.g., cubic feet per minute for a given fluid and pressure head.

These and further objects are accomplished by novel fluid filters in accordance with the present invention which comprise a sintered body having a permeability of from 1 to 45% and a porosity of from 1 to 55%. The body is formed from powder of a metal selected from the group consisting of titanium, zirconium, hafnium and their alloys, the powder having a bulk density of 1.5 to 5.6 grams per cc. and a particle size distribution within the range —100 to +325 mesh.

The method contemplated by the invention for producing fluid filters comprises filling a die or mold of known volume with a known weight of a powdered metal selected from the group consisting of titanium, zirconium, hafnium and alloys thereof, the metal powder having a particle shape ranging between spherical and smooth angular, a particle size distribution within the range —100+325 mesh, and bulk density within the range 1.5 to 5.6 grams per cc. The powder is then sintered in a non-reactive atmosphere under such conditions of time, temperature and pressure as to yield a body having a density of from 45 to 99% of the theoretical density of the metal in process.

Additional objects of the invention, its advantages, scope and the manner in which it may be practiced will be apparent to those conversant with the art from the following description and subjoined claims taken in conjunction with the annexed drawings in which:

Figure 1:
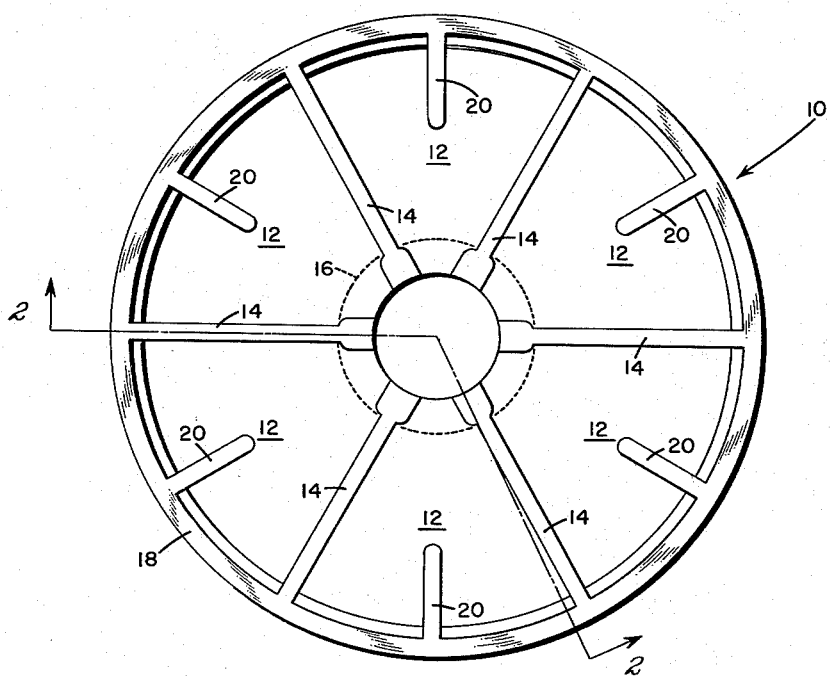
FIGURE 1 is a plan view of one form of filter element embodying the present invention.
Figure 2:
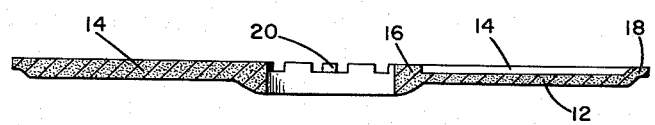
FIGURE 2 is a cross-sectional view taken on line 2—2 of FIGURE 1.

Referring now to the drawings and first particularly to FIGURES 1 and 2, there is illustrated a typical filter element 10 as contemplated by the invention. Filter element 10 is a monolithic, relatively thin disk-shaped annulus uniformly divided into circular sectors 12 by a plurality of radial reinforcing ribs 14 formed on one surface of the element. In addition, element 10 is formed with an annular hub 16 about its inner circumference and a rim 18 about its outer circumference. Ribs 14 extend between the hub 16 and rim 18. Further strengthening of the element is provided by a plurality of short radial ribs 20 extending radially inwardly from rim 18 part way to the hub at points intermediate full length radial ribs 14. The exposed upper surfaces of ribs 14, hub 16, rim 18, and ribs 20 lie in a common plane to facilitate joinder to a similar element as will now be explained.

Figure 3:
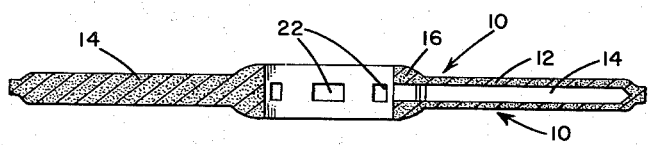
FIGURE 3 is a cross sectional view similar to FIGURE 2 showing a filter incorporating two filter elements welded together.

FIGURE 3 illustrates a completed filter comprising a pair of filter elements 10 concentrically disposed and secured together with the ribbed surfaces in confronting relation and with respective ribs 14 and 20 aligned and in surface contact thus forming a substantially hollow body having radial apertures 22 in hub 16 opening into the interior of the body. In operation of the filter the fluid flows through the filter walls 12 into its interior and then out of apertures 22.

Preferably filter elements 10 are joined by sintering or autogenous welding as hereinafter explained. When completed, bonding of the elements is so nearly perfect that it is difficult to detect the parting line.

In accordance with the present invention, elements 10 are formed of sintered metal powder and have a permeability of about 1 to 45%, a porosity of 1 to 55%, and a particle pass size of up to about 10 microns. The density of the body is between about 2.5 and 11.19 grams per cc. but inasmuch as this depends on the material from which it is formed as well as the porosity, density is best expressed in relation to theoretical density of the material, i.e., the density of a single crystal of such material or the density with zero porosity. The relative density of element 10 ranges between 45 and 99% of the theoretical.

It should be noted at this juncture that while a certain amount of porosity is essential to impart permeability to the filter element, porosity alone is not enough.

Permeability is more a function of the degree of interconnection between voids than of the degree of porosity. Thus it is conceivable that a highly porous body might be completely or substantially impermeable owing to lack of interconnection between voids. As explained in detail hereinbelow in conjunction with the description of methods for fabricating the filter elements, particular combinations of particle shape, particle size, and particle size distribution are required to obtain suitable ranges of permeability and pass size.

Figure 4:
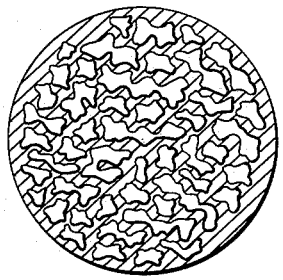
FIGURE 4 is a sectional view on a greatly enlarged scale of filter material according to the invention showing the tortuous interconnection of void spaces typical of such material and conferring the requisite permeability characteristics.

FIGURE 4 represents a greatly enlarged cross-section of the material of filter element 10. It will be noted that a high percentage of the contiguous voids are interconnected. The same interconnection exists with and among voids in other planes, not apparent in FIGURE 4. In consequence of this interconnection there is formed a plurality of microscopic, irregular tortuous passages extending entirely through the filter from one surface to the other.

Three different methods of fabricating filter elements are contemplated by the invention; they will be referred to as (1) hot pressing, (2) warm pressing and (3) gravity sintering and described in due course.

A highly important factor, common to all methods, is the starting material. As previously mentioned, this material consists of a powdered metal selected from the group consisting of titanium, zirconium, hafnium and their alloys.

Figure 5:
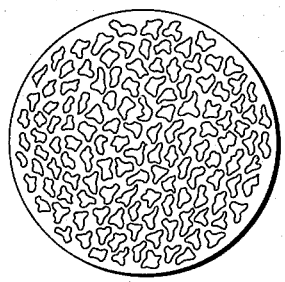
FIGURE 5 is a pictorial representation on a greatly enlarged scale of powder particles of the shape used in accordance with the invention.

One important feature of the powdered metal employed is its particle shape. It has been found that particles ranging in shape from spherical to that commonly designated as "smooth-angular" is satisfactory to produce filter elements. While spherical powder tends to yield filter elements of highest permeability for a given set of process parameters, smooth angular powder is preferred inasmuch as it results in entirely adequate permeability and also imparts higher mechanical strength. FIGURE 5 is a representation of powder particles of the smooth-angular type.

The principal difference between smooth-angular and sharp-angular powders is the absence in the former of the sharp projections and general sponginess found in the latter.

Another important consideration in selecting the starting powder is its bulk density. It has been determined that a powder whose bulk density more closely approaches the theoretical density is more suitable for making filter elements than a powder whose bulk density as compared with its theoretical density is low. A bulk density within the range of about ⅓ to ½ the theoretical density is satisfactory. Thus, for example, pure titanium powder should have a bulk density of from about 1.5 to 2.3.

The powder produced by most conventional comminuting methods is usually unsuited for the purposes of the present invention as it is ground slowly with very little internal cold-working. The product is a powder without appreciable densification, i.e., of low bulk density.

Powders suitable for the practice of the present invention and used in the examples given hereinbelow may be obtained by means of the comminuting process described in U.S. Letters Patent No. 2,892,697 issued to G. F. Davies et al. on a co-pending application Serial No. 423,924 filed April 19, 1954.

Another critical factor in the practice of the invention is the particle size and particle size distribution of the starting powder. On the basis of standard Tyler screen sizes, the general range of particle size should be −100+325 mesh and preferably −100+200. It is important that the +325 mesh value be observed as the presence of "fines" of −325 size and smaller is highly undesirable. A typical analysis of powder obtained by comminution of Kroll process sponge titanium by the method described in the aforementioned U.S. Patent No. 2,892,697 is as follows:

| | Percent |
|---|---|
| −60+100 | 32.8 |
| −150+200 | 17.4 |
| −200+325 | Balance |

The desirability of high purity source materials is apparent in deriving corrosion-resistant elements. For this reason only commercially available Kroll-process materials have been used although iodide process titanium or a titanium of sufficient purity obtained by any other process can be employed.

It is extremely important for the more severe filtering conditions that the powder, prior to processing into the filter, be at least 99% pure with respect to the impurities nitrogen, oxygen and hydrogen. Presence of metal ions, principally iron or magnesium, in total amounts up to 0.4% by weight are tolerable. Filter elements produced by the methods herein described have substantially the same analysis as the initial powder although Mg content is reduced by vacuum sintering process.

Satisfactory filter elements have been produced of alloys of titanium containing 3% aluminum and 5% chromium, and 2% iron and 4% chromium, with only small deviations from the corrosion resistance and fluid properties of the filter produced with unalloyed materials. Filters having 60% or more titanium or zirconium and the balance aluminum, iron, and/or chromium are in general highly resistant to corrosion and have good strength characteristics.

In all cases the methods contemplated by the invention and described below involve the use of a die in which the metal powder is formed into the filter element. In the hot pressing and warm pressing variations of the method, it is essential that the die material have adequate high temperature compressive strength and the ability to contain the powder under pressure without excessive formation of a superficial case. It has been found that coke-sintered high-density graphite is of value as a die material for this application. The extent of reaction between the titanium and carbon is minimized by thorough degassing of the graphite die before using, plus moderate applications of pressure on the die surface at the lowest acceptable temperature during the sintering operation.

Figure 6:
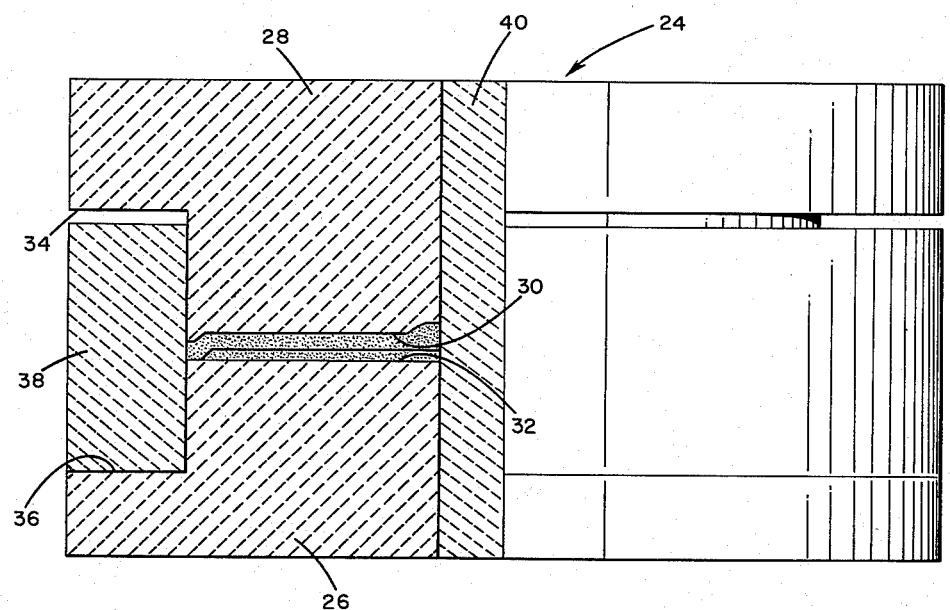
FIGURE 6 is a side elevational view, partly in section, showing a portion of the apparatus, viz., a stop die, employed in one of the methods contemplated by the invention for fabricating filter elements.

The preferred method for fabricating filter elements according to the invention is by hot pressing using a die constructed so that compression of the charge is terminated when it has attained a prefixed volume. Such a die, hereinafter referred to as a stop die, is illustrated in half-section in FIGURE 6 wherein it is designated generally by reference numeral 24. The die comprises a lower half 26 and an upper half 28, having respective confronting surfaces 30, 32 embossed to mold the charge to the desired final shape. Die halves 26 and 28 are formed with annular flanges 34 and 36, respectively, which co-act to form an annular groove extending circumferentially around the die for reception of a sleeve ring 38 which limits the closing movement of the die. A core plug 40 extends axially through the center of die 24 and forms the opening in the hub 16 of filter element 10.

In the hot press method the final density and, therefore, the permeability of the filter element (all other process parameters such as particle size, particle shape, etc., being equal) is determined by the amount of reduction of the volume of the die charge. The ratio of the start to finish volume is usually in the range of 2 or 3 to 1.

With sleeve ring 38 and plug 40 assembled on the lower half 26 of die 24, the die is charged with a known weight of the prepared powder which is then mechanically doctored to insure a uniform distribution with respect to the desired contour. The upper half 28 of the die is then set in place within sleeve ring 38 and the assembly is disposed within a furnace retort which is substantially air tight and has provisions for applying a compressive force on the die while in a non-reactive atmosphere and heated to high temperatures. Conveniently, an inert atmosphere may be provided in the form of substantially pure helium or argon or an adequate partial vacuum (e.g., pressure less than .020 mm. of Hg). In any case the inert atmosphere is established prior to heating the furnace. The temperature to which the die and its contents are heated varies with the material but is in the range 825 to 1100° C. The time and pressure are likewise variable and may be determined on the basis of the following example.

EXAMPLE I

Hot pressing

A smooth-angular titanium powder having a bulk density of 1.5 gms./cc. was prepared in accordance with the method described in the aforementioned U.S. Patent No. 2,892,697. The powder was screened and a blend made consisting of about 65% of a —100+150 mesh fraction and the balance of a —150+200 mesh fraction.

A 52.21 gram charge of this powder was loaded into a stop die having a closed volume of 23.2 cc. and doctored.

The loaded die was placed in a furnace retort evacuated to a pressure of less than about .005 mm. of Hg and the furnace temperature raised to 1000 to 1050° C. When the die temperature reached about 980° C. a pressure of 130 p.s.i (sufficient to close the stop die) was applied. in 1½ hours the temperature of the die stabilized at 1000 to 1015° C. whereupon the pressure was released and the furnace allowed to cool to room temperature, the inert atmosphere being maintained. The element then was stripped from the die and had a density of about 2.3 grams per cc., a porosity of about 40%, and a volume flow capacity of about 25 cubic feet of air per minute per square foot at a differential pressure of 3.5 inches of $H_2O$ corresponding to a permeability of about 18%.

The warm press method is carried out at lower temperatures and is followed by a separate sintering step. A stop die such as that already described or one made of alloy steel rather than graphite is heated to a temperature around 400 to 550° C., loaded with a known weight of powder and the upper half or plunger assembled. The die is then placed in a low temperature furnace and heated until the temperature of the die and its contents stabilizes whereupon pressure sufficient to close the die is applied to the plunger. The element, at this stage has sufficient strength to permit handling. It is removed from the die and placed in a sintering furnace where it is sintered in a non-reactive atmosphere for a predetermined time usually ranging from 1 to 4 hours.

EXAMPLE II

Warm pressing

A filter element of the same size and properties described in Example I may be obtained with the same starting powder with a warm pressing temperature of about 513° C. followed by vacuum sintering for 1½ hours at a temperature of about 980° C.

Where a filter such as shown in FIGURE 3 is to be formed by joinder of two filter elements by means of autogenous welding, the warm pressing step is the same but prior to sintering the elements are assembled in the proper relation under suitable pressure in a welding die or jig. During the sintering operation, the matching surfaces thus become welded together.

In certain filter applications, high volume flow capacity is the pimary requirement and low strength is sufficient to the application. Filter elements suitable for such uses can be fabricated by means of gravity sintering using simplified equipment. In this method a coke-sintered graphite mold, similar to a simple casting mold, is charged with a known weight of powder. Inasmuch as no pressure is applied to reduce the charge, the resulting porosity and permeability is determined primarily by the extent to which the powder packs together initially without pressure; consequently, the packing should be such as to bring it roughly within the desired range of the finished element. The degree of packing is controlled by variation of the particle size distribution within the general limits +325—100 mesh and the preferred limits +200—100 mesh. A higher percentage of larger particles results in greater porosity and permeability.

After loading, the mold is capped with a graphite cover and then heated to and maintained at sintering temperature in a non-reactive atmosphere for several hours. The sintering temperature is within the range of 825 to 1100° C. and the duration of the sintering period, normally 1 to 8 hours, depends on the strength and degree of densification desired. Strength varies directly and fluid permeability inversely with sintering time.

EXAMPLE III

Gravity sintering

A filter element having a porosity of about 50% and a permeability of about 40% may be obtained with the same starting powder as described in Example I sintered at about 1000° C. for about 3½ hours in a vacuum of .005 mm. of Hg.

From the foregoing description it will be understood that, within the ranges specified, one or a combination of variables may be adjusted to control the strength and permeability of the product. Generally speaking high percentages of larger particle sizes, less mechanical reduction (where employed), lower temperatures and shorter duration of high temperatures individually and collectively work to increase permeability, lower density, and less mechanical strength.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

I claim:

1. As a new article of manufacture, a permeable body having a permeability greater than about 1 and less than about 45% and consisting of sintered powder of a metal selected from the group consisting of titanium, zirconium, hafnium and alloys thereof, said powder having a bulk density of from about ⅓ to ½ the theoretical density of said metal, said body being characterized by void spaces substantially uniformly distributed throughout its volume, a sufficiently high percentage of contiguous void spaces being interconnected, so as to form continuous passages of minute cross-section extending through the body between opposite external surfaces thereof, to impart said permeability to the body.

2. As a new article of manufacture, a sintered body having a permeability of greater than about 1 and less than about 45% and composed of sintered powder of a metal selected from the group consisting of titanium, zirconium and hafnium, said powder being at least 99% pure metal and having a bulk density of from about ⅓ to ½ the theoretical density of said metal, said body being characterized by void spaces substantially uniformly distributed throughout its volume, a sufficiently high percentage of contiguous void spaces being interconnected, so as to form continuous passages of minute cross-section extending through the body between opposite external surfaces thereof, to impart said permeability to the body.

3. As a new article of manufacture, a sintered body having a density between 1.8 and 4.45 grams per cc. and a permeability greater than about 1 and less than about 45%, said body being composed of sintered titanium powder of at least 99% purity and having a bulk density of about 1.5 to 2.3 grams per cc., said body being characterized by void spaces substantially uniformly distributed throughout its volume, a sufficiently high percentage of contiguous void spaces being interconnected, so as to form continuous passages of minute cross-section extending through the body between opposite external surfaces thereof, to impart said permeability to the body.

4. As a new article of manufacture, a sintered body having a density of between 3.4 and 6.32 grams per cc. and a permeability greater than about 1 and less than about 45%, said body being formed from zirconium powder of at least 99% purity and having a bulk density of 2.1 to 3.2 grams per cc., said body being characterized by void spaces substantially uniformly distributed throughout its volume, a sufficiently high percentage of contiguous void spaces being interconnected, so as to form continuous passages of minute cross-section extending through the body between opposite external surfaces thereof, to impart said permeability to the body.

5. A fluid filter comprising a sintered body having a permeability of about 1 to 45%, a density between 1.8 and 4.45 grams per cc., and a porosity of from 1 to 55%, said body being formed from titanium powder having a bulk density of 1.5 to 2.3 grams per cc., said body being characterized by void spaces substantially uniformly distributed throughout its volume, a sufficiently high percentage of contiguous void spaces being interconnected, so as to form continuous passages of minute cross-section extending through the body between opposite external surfaces thereof, to impart said permeability to the body.

6. A fluid filter comprising a sintered body having a permeability of from 1 to 45% and a porosity of from 1 to 55%, said body being formed from powder of a metal selected from the group consisting of titanium, zirconium and hafnium, said powder having a bulk density of from about ⅓ to ½ the theoretical density of said metal and a particle size distribution within the range −100 to +325 mesh, said body being characterized by void spaces substantially uniformly distributed throughout its volume, a sufficiently high percentage of contiguous void spaces being interconnected, so as to form continuous passages of minute cross-section extending through the body between opposite external surfaces thereof, to impart said permeability to the body.

7. A fluid filter comprising a sintered body having a permeability of from 1 to 45%, a density between 2.2 and about 6.38 grams per cc. and a porosity of 1 to 55%, said body being formed from zirconium powder having a bulk density of 2.1 to 3.2 grams per cc. and a particle size distribution of −100 to +325 mesh, said body being characterized by void spaces substantially uniformly distributed throughout its volume, a sufficiently high percentage of contiguous void spaces being interconnected, so as to form continuous passages of minute cross-section extending through the body between opposite external surfaces thereof, to impart said permeability to the body.

8. A fluid filter comprising a permeable body having a density of about 50% of the theoretical maximum, a maximum particle pass size of 10 microns, and a permeability of about 18%, said body being formed from titanium powder having a particle size distribution within the range −100 mesh to +200 mesh and a bulk density of about 1.5 to 2.3 grams per cc., said body being characterized by void spaces substantially uniformly distributed throughout its volume, a sufficiently high percentage of contiguous void spaces being interconnected, so as to form continuous passages of minute cross-section extending through the body between oposite external surfaces thereof, to impart said permeability to the body.

9. A fluid filter comprising a permeable body having a permeability between 1 and 45% and a density of 1.8 to about 4.5 grams per cc., said body being formed from a 99% pure titanium powder the individual particles of which have a shape within the range between spherical and smooth angular, said powder having a particle size distribution between −100 mesh and +325 mesh and a bulk density between 1.5 and 2.3 grams per cc., said body being characterized by void spaces substantially uniformly distributed throughout its volume, a sufficiently high percentage of contiguous void spaces being interconnected, so as to form continuous passages of minute cross-section extending through the body between opposite external surfaces thereof, to impart said permeability to the body.

10. A method of forming fluid permeable elements comprising: preparing a powder of a metal selected from the group consisting of titanium, zirconium, hafnium and their alloys, said powder having a bulk density ranging from ⅓ to ½ of the theoretical density of said metals, having a particle size distribution of +325−100 mesh and a characteristic particle shape ranging from spherical to smooth angular; heating a quantity of said powder in a non-reactive atmosphere to a temperature of about 825 to 1100° C.; and applying pressure to said quantity of powder sufficient to reduce its volume by ½ to ⅔.

11. A method of forming fluid permeable elements comprising: preparing a metal powder consisting primarily of titanium and having a bulk density ranging from 1.5 to 2.3 grams per cc., a particle size distribution of +200−100 mesh and a characteristic particle shape ranging from spherical to smooth angular; heating a quantity of said powder in a non-reactive atmosphere to a temperature of about 1000° C.; and applying pressure to said quantity of powder sufficient to reduce its volume by ½ to ⅔.

12. A method of forming fluid permeable elements comprising: preparing a metal powder consisting primarily of titanium and having a bulk density of about 1.5 grams per cc., a particle size distribution of about 65% by weight −100+150 mesh and a balance of −150+200 mesh, said powder having a characteristic particle shape ranging from spherical to smooth angular; heating a quantity of said powder in a non-reactive atmosphere to a temperature of about 1000° C.; and applying pressure to said quantity of powder sufficient to reduce its volume by about ½.

13. A method of forming fluid permeable elements comprising: preparing a powder of a metal selected from the group consisting of titanium, zirconium, hafnium and their alloys, said powder having a bulk density ranging from ⅓ to ½ of the theoretical density of said metals, having a particle size distribution of +200−100 mesh and a characteristic particle shape ranging from spherical to smooth angular; heating a quantity of said powder in a non-reactive atmosphere to a temperature of about 400° to 550° C.; applying pressure to said quantity of powder sufficient to reduce its volume by ½ to ⅔; releasing said pressure and thereafter sintering the compacted powder in a non-reactive atmosphere at a temperature in the range of 825° to 1100° C. for from 1 to 8 hours.

14. A method of forming fluid permeable elements comprising: preparing a metal powder consisting primarily of titanium and having a bulk density of about 1.5 grams per cc., a particle size distribution of +200−100 mesh and a characteristic particle shape ranging from spherical to smooth angular; heating a quantity of said powder in a non-reactive atmosphere to a temperature of about 400° to 550° C.; applying pressure to said quantity of powder sufficient to reduce its volume by ½ to ⅔; releasing said pressure and thereafter sintering the compacted powder in a non-reactive atmosphere at a temperature in the range of 825 to 1100° C. for from 1 to 8 hours.

References Cited in the file of this patent

UNITED STATES PATENTS

| | | |
|---|---|---|
| 2,554,343 | Pall | May 22, 1951 |
| 2,721,378 | Oliver | Oct. 25, 1955 |

OTHER REFERENCES

"Transactions" AIMME, vol. 166, 1946, pp. 376–379.
Gonser: "Symposium on Titanium," U.S. Office of Naval Research, Dec. 16, 1948, p. 60.
Goetzel: "Treatise on Powder Metallurgy," vol. 2, pp. 532, 533, publ. 1950.